(12) United States Patent
Fukushima

(10) Patent No.: US 10,778,886 B2
(45) Date of Patent: Sep. 15, 2020

(54) IMAGING CONTROL SYSTEM, IMAGING CONTROL METHOD, PROGRAM, AND RECORDING MEDIUM

(71) Applicant: FUJIFILM Corporation, Tokyo (JP)

(72) Inventor: Toshimitsu Fukushima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/199,272

(22) Filed: Nov. 26, 2018

(65) Prior Publication Data

US 2019/0199914 A1    Jun. 27, 2019

(30) Foreign Application Priority Data

Dec. 27, 2017   (JP) ................................. 2017-251363

(51) Int. Cl.
  *H04N 5/232*   (2006.01)
  *G06T 7/00*    (2017.01)
  *G06T 7/80*    (2017.01)
  *G06K 9/00*    (2006.01)

(52) U.S. Cl.
  CPC ..... *H04N 5/23219* (2013.01); *G06K 9/00281* (2013.01); *G06T 7/0002* (2013.01); *G06T 7/80* (2017.01); *G06T 2207/30168* (2013.01)

(58) Field of Classification Search
  CPC ........................ H04N 5/23222; H04N 5/23219
  See application file for complete search history.

(56) References Cited

U.S. PATENT DOCUMENTS

| | | | |
|---|---|---|---|
| 8,244,119 B2 | 8/2012 | Tanabe | |
| 2008/0232652 A1* | 9/2008 | Nonaka | G06K 9/00228 382/118 |
| 2011/0064396 A1 | 3/2011 | Tanabe | |
| 2012/0274804 A1 | 11/2012 | Tanabe | |
| 2015/0077576 A1* | 3/2015 | Sako | H04N 5/765 348/207.11 |
| 2018/0012005 A1* | 1/2018 | Hallock | G06F 21/316 |

FOREIGN PATENT DOCUMENTS

| | | |
|---|---|---|
| JP | 2011-061703 A | 3/2011 |
| JP | 2013-021614 A | 1/2013 |

* cited by examiner

*Primary Examiner* — Christopher K Peterson
(74) *Attorney, Agent, or Firm* — Studebaker & Brackett PC

(57) ABSTRACT

Provided is an imaging control system that prevents a user of a digital imaging device from using a captured image without permission or capturing an inappropriate image. In an imaging control system, an imaging control method, a program, and a recording medium, evaluation information on each user is acquired in a digital imaging device of each user, a function of the digital imaging device of each user is controlled on the basis of the evaluation information on each user, images captured by plural digital imaging devices are analyzed, evaluation for an image captured by the digital imaging device of each user is performed on the basis of the analysis result, and evaluation information on each user is updated on the basis of the evaluation of the image.

22 Claims, 3 Drawing Sheets

IMAGING CONTROL SYSTEM, IMAGING CONTROL METHOD, PROGRAM, AND RECORDING MEDIUM

CROSS-REFERENCE TO RELATED APPLICATIONS

The present application claims priority under 35 U.S.C. § 119 to Japanese Patent Application No. 2017-251363, filed on Dec. 27, 2017. The above application is hereby expressly incorporated by reference, in its entirety, into the present application.

BACKGROUND OF THE INVENTION

1. Field of the Invention

The present invention relates to an imaging control system, an imaging control method, a program, and a recording medium for controlling a function of a digital imaging device used by a user on the basis of an image captured by the user.

2. Description of the Related Art

A digital imaging device such as a digital camera or a smartphone has been widely used. On the other hand, in a school event such as a school excursion, an analog imaging device such as a one-time use camera has been utilized.

In a case where an analog imaging device is used, images captured by students are collected, a teacher can check imaging content of the images. Thus, it is possible to prevent the students from uploading the captured images on a social networking service (SNS) or the like without permission, or to prevent the students from capturing inappropriate images such as an image in which a person who is being bullied is taken.

However, in a case where the analog imaging device is used, there are disadvantages in a digital imaging device in terms of convenience in that students cannot check captured images on the site and there is a limitation in the number of shots (about maximum 39).

Here, as related art documents relating to the invention, there are JP2013-021614A and JP2011-061703A.

SUMMARY OF THE INVENTION

An object of the invention is to provide an imaging control system, an imaging control method, a program, and a recording medium capable of preventing a user of a digital imaging device from using a captured image without permission or from capturing an inappropriate image.

In order to achieve the object of the invention, according to an aspect of the invention, there is provided an imaging control system that includes a plurality of digital imaging devices respectively used for capturing images by a plurality of users, and one or more evaluation collection devices that receive evaluation information of the plurality of users from the plurality of digital imaging devices, comprising: a user information registration section that registers information on the plurality of users; a user setting section that sets the plurality of users who respectively use the plurality of digital imaging devices using the information on the plurality of users registered in the user information registration section; an evaluation information storage section that stores evaluation information on the plurality of users; an evaluation information acquisition section that acquires the evaluation information on each of the plurality of users from the evaluation information storage section to the digital imaging device of each user, on the basis of settings of the digital imaging devices respectively used by the plurality of users; an imaging function controller that controls a function of the digital imaging device of each user, on the basis of the evaluation information on each user acquired by the evaluation information acquisition section; an image analysis section that analyzes images captured by the plurality of digital imaging devices; an analysis result storage section that stores each user and an analysis result of an image captured by the digital imaging device of each user in association with each other; and an evaluation information updating section that performs evaluation of the image captured by the digital imaging device of each user on the basis of the analysis result stored in the analysis result storage section, and updates the evaluation information on each user stored in the evaluation information storage section on the basis of the evaluation of the image captured by the digital imaging device of each user.

Here, it is preferable that the image analysis section performs at least one of determination or recognition of a blurriness level of an image, a brightness of the image, a color of the image, the number of persons taken in the image, an expression of a person taken in the image, and an object taken in the image, as items of the analysis, to calculate a score for each analysis item.

Further, it is preferable that the evaluation information updating section uses an average point of scores for all the analysis items of all images captured by the digital imaging device of each user as a score of the evaluation information on each user.

Further, it is preferable that the evaluation information updating section uses a ratio of the number of images of which an average point of scores for all the analysis items is equal to or larger than a threshold value to all images captured by the digital imaging device of each user, as a score of the evaluation information on each user.

Further, it is preferable that the one or more evaluation collection devices receive the evaluation information on the plurality of users at a predetermined time interval.

Further, it is preferable that the one or more evaluation collection devices receive the evaluation information on each user whenever an image is captured by the digital imaging device of each user.

Further, it is preferable that the one or more evaluation collection devices receive the evaluation information on each user whenever the evaluation information of each user is changed in a case where the score of the evaluation information is set to be changed in stages.

Further, it is preferable that the one or more evaluation collection devices receive the evaluation information on each user in a case where each user gives a command for collecting the evaluation information on each user.

Further, it is preferable that the one or more evaluation collection devices transmit the evaluation information on one digital imaging device among the plurality of digital imaging devices to another digital imaging device.

Further, it is preferable that each digital imaging device transmits an image captured by each of the digital imaging devices to the one or more evaluation collection devices.

Further, it is preferable that each digital imaging device transmits the images captured by each of the digital imaging devices to the one or more evaluation collection devices, and in a case where the average point of the scores for all the analysis items of an image is smaller than a threshold value, each digital imaging device lowers an image quality of the image of which the average point of the scores is smaller than the threshold value and transmits the result to the one or more evaluation collection devices.

Further, it is preferable that each digital imaging device further transmits, in a case where the image is transmitted, information relating to the control of the function of the digital imaging device in a case where the image is captured to the one or more evaluation collection devices.

Further, it is preferable that the one or more evaluation collection devices transmit an image captured by one digital imaging device among the plurality of digital imaging devices to another digital imaging device.

Further, it is preferable that the one or more evaluation collection device transmits only an image of which the average point of the scores for all the analysis items is equal to or larger than the threshold value among all images captured by one digital imaging device among the plurality of digital imaging devices to another digital imaging device.

Further, it is preferable that each digital imaging device transmits images captured by each of the digital imaging devices to the one or more evaluation collection devices, and the one or more evaluation collection devices include a synthetic image creation section that selects an image of which the average point of the scores for all the analysis items is equal to or greater than a threshold value to create a synthetic image.

Further, it is preferable that whenever an image is captured by the digital imaging device of each user, the image analysis section analyzes the image, and the evaluation information updating section updates the evaluation information on each user.

Further, it is preferable that whenever a predetermined number of images are captured by the digital imaging device of each user, the image analysis section analyzes the images, and the evaluation information updating section updates the evaluation information on each user.

Further, it is preferable that the image analysis section analyzes the image captured by the digital imaging device of each user at a predetermined time interval, and whenever the image captured by the digital imaging device of each user is analyzed by the image analysis section, the evaluation information updating section updates the evaluation information on each user.

Further, it is preferable that the imaging control system further comprises a same person determination section that determines whether the user of each digital imaging device is identical to the user of each digital imaging device set by the user setting section during image capturing.

Further, it is preferable that the imaging control system further comprises a face image capturing section that captures a face image of the user of each digital imaging device during image capturing, in which the face image capturing section periodically captures the face image of each user, and whenever the face image is captured by the face image capturing section, the same person determination section compares the face image captured by the face image capturing section during image capturing with a face image included in the information on the plurality of users to determine whether both the users are identical to each other.

Further, it is preferable that the imaging control system further comprises a face image capturing section that captures a face image of the user of each digital imaging device during image capturing; and a same person determination section that determines whether the user of each digital imaging device is identical to the user of each digital imaging device set by the user setting section during image capturing, in which the face image capturing section captures the face image of each user in a case where a state where the score of the evaluation information on each user is changed by a threshold value or greater consecutively occurs a predetermined number of times or more, and in a case where the face image is captured by the face image capturing section, the same person determination section compares the face image captured by the face image capturing section during image capturing with a face image included in the information on the plurality of users to determine whether both the users are identical to each other.

Further, it is preferable that the imaging control system further comprises a same person determination section that determines whether the user of each digital imaging device is identical to the user of each digital imaging device set by the user setting section during image capturing, in which in a case where a state where the score of the evaluation information on each user is changed by a threshold value or greater consecutively occurs a predetermined number of times or more, the same person determination section determines whether the users are identical to each other by requesting inputs of passwords for specifying the respective users.

Further, it is preferable that the user information registration section registers the information on each user input by manually operating, by each user, a GUI provided by the digital imaging device of each user before image capturing.

Further, it is preferable that the imaging control system further comprises a face image capturing section that captures a face image of the user of each digital imaging device during image capturing, in which the user information registration section registers the face image of each user captured by the face image capturing section during image capturing as the information on each user.

Further, it is preferable that the imaging function controller controls at least one of a hardware function of the digital imaging device or a software function of the digital imaging device, as a function of the digital imaging device.

Further, it is preferable that the hardware function includes at least one of flash, zoom, stop, or continuous shooting.

Further, it is preferable that the software function includes at least one of the number of possible shots of the image, display of a back monitor, auto-focus, digital zoom, or a time interval at which the image can be captured.

According to another aspect of the invention, there is provided an imaging control method for controlling image capturing in an imaging control system that includes a plurality of digital imaging devices respectively used for capturing images by a plurality of users and one or more evaluation collection devices that receive evaluation information of the plurality of users from the plurality of digital imaging devices, the method comprising: registering information on the plurality of users, through a user information registration section; setting the plurality of users who respectively use the plurality of digital imaging devices using the information on the plurality of users registered in the user information registration section, through a user setting section; storing evaluation information on the plurality of users, through an evaluation information storage section; acquiring the evaluation information on each of the plurality of users from the evaluation information storage section to the digital imaging device of each user, on the basis of settings of the digital imaging devices respectively used by the plurality of users, through an evaluation information acquisition section; controlling a function of the digital imaging device of each user, on the basis of the acquired evaluation information on each user through an imaging function controller; analyzing images captured by the plurality of digital imaging devices, through an image analysis section; storing each user and an analysis result of an image captured by the digital imaging device of each user in association with each other, through an analysis result storage section; and performing evaluation of the image captured by the digital imaging device of each user on the basis of the analysis result stored in the analysis result storage section, and updates the evaluation information on each user stored in the evaluation information storage section on the basis of the evaluation of the image captured by the digital imaging device of each user, through an evaluation information updating section.

According to still another aspect of the invention, there is provided a program for causing a computer to execute the respective steps of the imaging control method.

Further, according to still another aspect of the invention, there is provided a non-transitory computer-readable recording medium on which a program for causing a computer to execute the respective steps of the imaging control method is recorded.

According to still another aspect of the invention, there is provided an imaging control system that includes a plurality of digital imaging devices respectively used for capturing images by a plurality of users, and one or more evaluation collection devices that receive evaluation information of the plurality of users from the plurality of digital imaging devices, comprising: a user information registration section that registers information on the plurality of users; a user setting section that sets the plurality of users who respectively use the plurality of digital imaging devices using the information on the plurality of users registered in the user information registration section; an evaluation information storage section that stores evaluation information on the plurality of users; an evaluation information acquisition section that acquires the evaluation information on each of the plurality of users from the evaluation information storage section to the digital imaging device of each user, on the basis of settings of the digital imaging devices respectively used by the plurality of users; an imaging function controller that controls a function of the digital imaging device of each user, on the basis of the evaluation information on each user acquired by the evaluation information acquisition section; an image analysis section that analyzes images captured by the plurality of digital imaging devices; an analysis result storage section that stores each user and an analysis result of an image captured by the digital imaging device of each user in association with each other; and an evaluation information updating section that performs evaluation of the image captured by the digital imaging device of each user on the basis of the analysis result stored in the analysis result storage section, and updates the evaluation information on each user stored in the evaluation information storage section on the basis of the evaluation of the image captured by the digital imaging device of each user, in which the user information registration section, the user setting section, the evaluation information acquisition section, the imaging function controller, the image analysis section, and the evaluation information updating section are configured by hardware, or by a processor that executes a program.

According to the invention, by controlling a function of a digital imaging device used by each user on the basis of evaluation information on each user, it is possible to prevent each user from using a captured image without permission or from capturing an inappropriate image, to thereby increase a motivation to capture an appropriate image.

DESCRIPTION OF THE PREFERRED EMBODIMENTS

Hereinafter, an imaging control system, an imaging control method, a program, and a recording medium of the invention will be described in detail on the basis of a preferred embodiment shown in the accompanying drawings.

Figure 1:
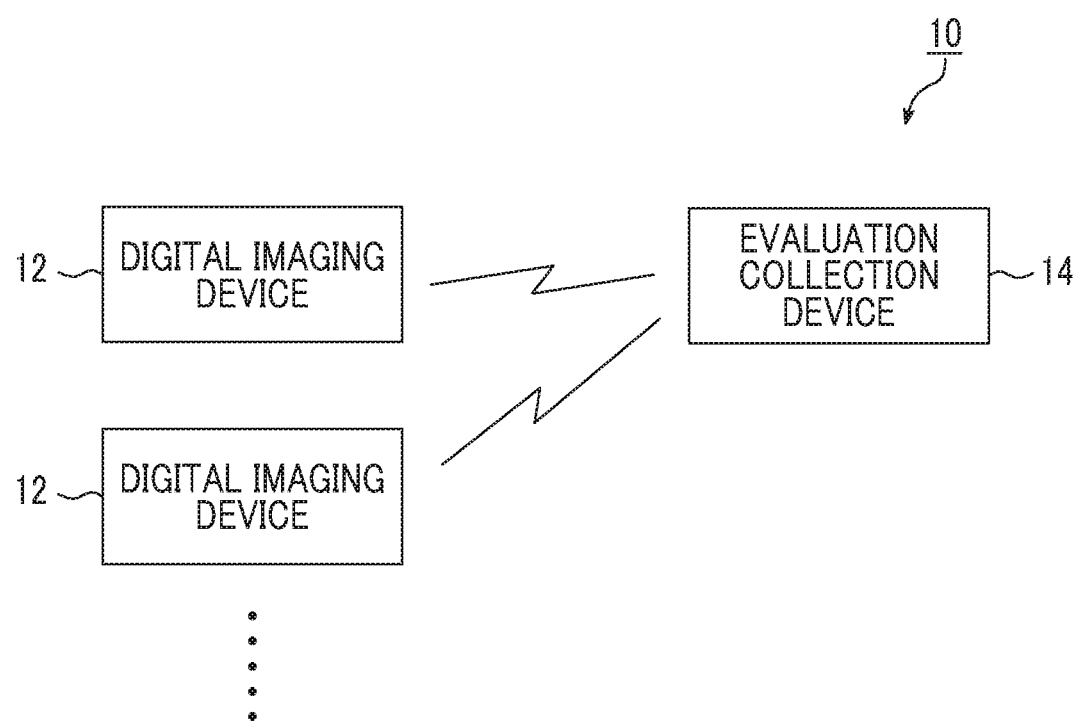
FIG. 1 is a block diagram showing a configuration of an imaging control system according to an embodiment of the invention.

FIG. 1 is a block diagram showing a configuration of an imaging control system according to the embodiment of the invention. An imaging control system 10 shown in FIG. 1 includes a plurality of digital imaging devices 12 through which a plurality of users capture images, and an evaluation collection device 14 that receives evaluation information on the plurality of users from the plurality of digital imaging devices 12. The imaging control system 10 evaluates a user on the basis of an image captured by the user, and controls a function of the digital imaging device 12 used by the user in accordance with the evaluation information.

In a case where the imaging control system 10 is used in a school event such as a school excursion, for example, a user who uses the digital imaging device 12 is a student, and a user who uses the evaluation collection device 14 is a teacher. Each user is not limited to one person, and may be plural persons included in a group. Further, the imaging control system 10 may include one evaluation collection device 14, or two or more evaluation collection devices 14. In a case where two or more evaluation collection devices 14 are provided, for example, two or more teachers use the two or more evaluation collection devices 14, respectively.

The digital imaging device 12 is a digital mobile communication terminal having a camera function (an imaging application installed in a smartphone) and a wireless communication function, such as a smartphone. The evaluation collection device 14 is a digital mobile communication terminal such as a smartphone, or a communication device having a wireless communication function, such as a personal computer (PC), a note PC, a tablet PC, or a server. The plurality of digital imaging devices 12 and the evaluation collection device 14 may be connected to each other through wireless communication.

Figure 2:
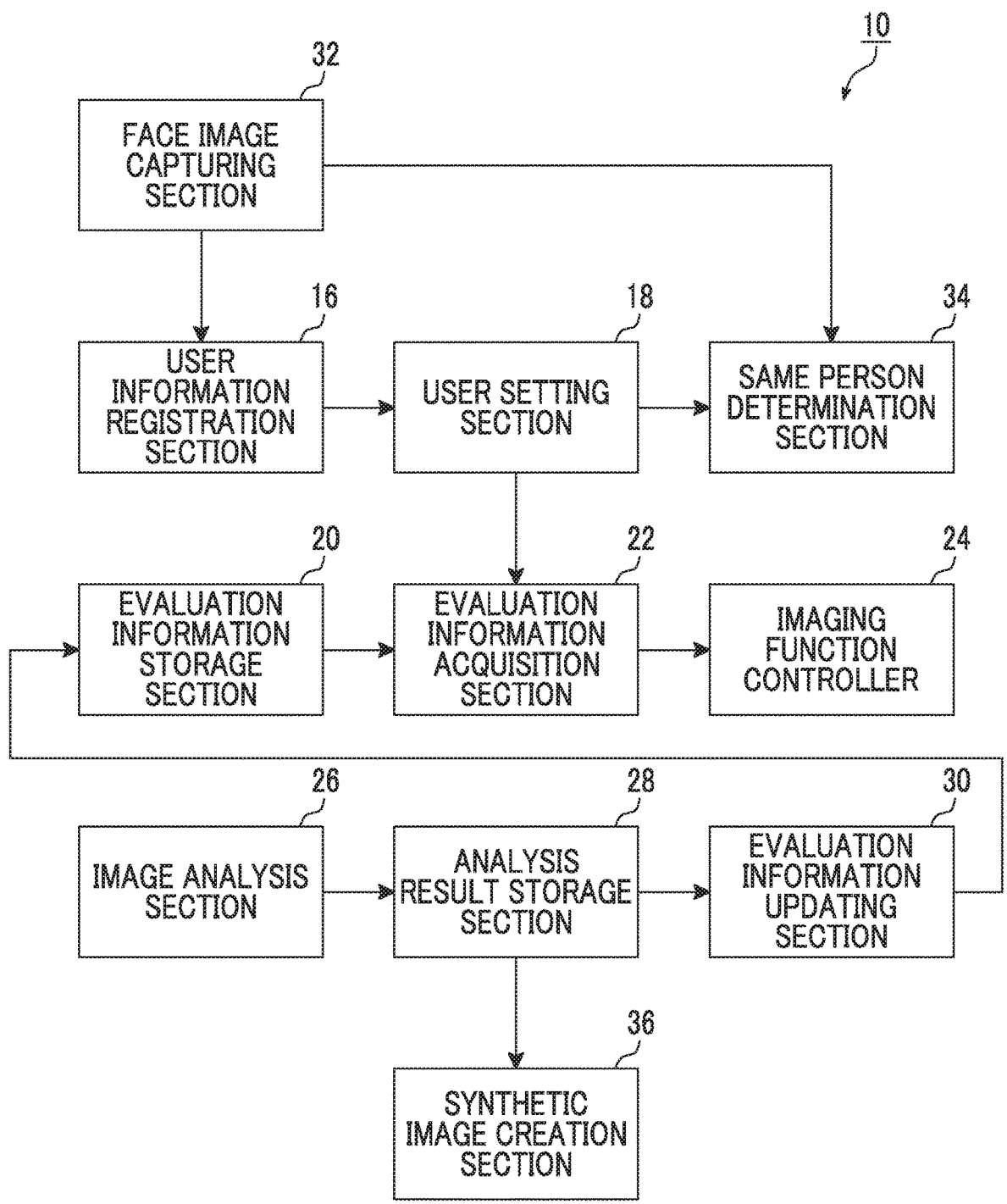
FIG. 2 is a block diagram showing an internal configuration of the imaging control system according to the embodiment of the invention.

FIG. 2 is a block diagram showing an internal configuration of the imaging control system according to the embodiment of the invention. The imaging control system includes therein a user information registration section 16, a user setting section 18, an evaluation information storage section 20, an evaluation information acquisition section 22, and imaging function controller 24, an image analysis section 26, an analysis result storage section 28, an evaluation information updating section 30, a face image capturing section 32, a same person determination section 34, and a synthetic image creation section 36, as shown in FIG. 2.

Each digital imaging device 12 at least includes the user information registration section 16, the user setting section 18, the evaluation information acquisition section 22, the imaging function controller 24, and the face image capturing section 32, and the evaluation collection device 14 at least includes the synthetic image creation section 36. The evaluation information storage section 20, the image analysis section 26, the analysis result storage section 28, the evaluation information updating section 30, and the same person determination section 34 may be provided in each digital imaging device 12, or may be provided in the evaluation collection device 14.

In the imaging control system 10, the user information registration section 16 registers information on a plurality of users who use the imaging control system 10, in each of the digital imaging devices 12.

The information on the users represents information for uniquely identifying the plurality of users, which is not particularly limited, but may include a user name, an address, a telephone number, a face image, or the like. Further, in a case where the users are students, student numbers may be used as the information on the users.

A user registration method and a user registration timing are not particularly limited, but the user information registration section 16 may register information on each user input by manually operating, by each user, a graphical user interface (GUI) for user registration and setting provided by the digital imaging device 12 of each user before starting using the digital imaging device 12, that is, before image capturing.

Alternatively, the user information registration section 16 may detect and recognize a face image of each user that is captured in real time by the face image capturing section 32 (which will be described later) while the digital imaging device 12 is being used, that is, during image capturing to automatically register the face image as the information on each user.

Subsequently, the user setting section 18 sets the plurality of users who respectively use the plurality of digital imaging devices 12 using the information on the plurality of users registered in the user information registration section 16, in the respective digital imaging devices 12, before image capturing.

A method for setting a user who uses the digital imaging device 12 is not particularly limited, but the user setting section 18 may perform a setting so that a user "A" uses a first digital imaging device 12 and a user "B" uses a second digital imaging device 12 from a list of names of users registered by the user information registration section 16 and a list of the plurality of digital imaging devices 12, for example, by manually operating, by each user, the GUI for user registration and setting provided by the digital imaging device 12 of each user.

Subsequently, the evaluation information storage section 20 stores the evaluation information on the plurality of users.

The evaluation information refers to information for evaluating right and wrong of each user on the basis of an analysis result of an image captured by each user, which is not particularly limited. For example, a score of the image calculated on the basis of the image analysis result may be used as a score of the evaluation information. The score of the evaluation information may be set to be continuously changed, or may be set to be changed in stages, for example, in 2 stages or 5 stages.

Subsequently, the evaluation information acquisition section 22 acquires the evaluation information on each of the plurality of users into the digital imaging device 12 of each user from the evaluation information storage section 20 on the basis of settings of the digital imaging devices 12 respectively used by the plurality of users before image capturing or during image capturing.

Subsequently, the imaging function controller 24 controls a function of the digital imaging device 12 of each user on the basis of the evaluation information on each user acquired by the evaluation information acquisition section 22 before image capturing or during image capturing.

The imaging function controller 24 controls at least one of a hardware function or a software function, as the function of the digital imaging device 12. The hardware function includes at least one of flash, zoom, stop, or continuous shooting, for example, and the software function includes at least one of the number of possible shots, display of a back monitor, auto-focus, digital zoom, or a time interval at which an image can be captured.

The hardware function and the software function of the digital imaging device 12 are not particularly limited, and other various functions may be controlled.

A timing when the function of the digital imaging device 12 is controlled is not particularly limited, but for example, whenever the evaluation information is updated by the evaluation information updating section 30, the function of the digital imaging device 12 may be controlled.

Further, a method for controlling the function of the digital imaging device 12 is not particularly limited, but as shown in Table 1, for example, in a case where the score of the evaluation information is set to 5 stages, the function of the digital imaging device 12 may be controlled in 5 stages, in a similar way to the score of the evaluation information.

TABLE 1

| Score of evaluation information | Number of shots that can be taken | Display of back monitor | Use of flash | Zoom | Continuous shooting |
|---|---|---|---|---|---|
| 5 | No limit | Available | Available | Available | Available |
| 4 | 300 | Available | Available | Available | Unavailable |
| 3 | 150 | Unavailable | Available | Available | Unavailable |
| 2 | 50 | Unavailable | Unavailable | Available | Unavailable |
| 1 | 10 | Unavailable | Unavailable | Unavailable | Unavailable |

In Table 1, in a case where the score of the evaluation information is "5", there is no limit. For example, the number of possible shots is not limited, and display of a back monitor, and use of flash, zoom and continuous shooting are completely allowed. In a case where the score of the evaluation information is "4", the number of possible shots is limited to 300, and continuous shooting is not allowed. In a case where the score of the evaluation information is "3", "2", and "1", the functions are limited in a similar way. That is, the functions are more greatly limited as the score of the evaluation information becomes smaller.

Further, in a case where the evaluation information is set to 2 stages of "right" and "wrong", the function of the digital imaging device 12 may be controlled in 2 stages. For example, in a case where the evaluation information is "right", the function of the digital imaging device 12 is not limited, and in a case where the evaluation information is "wrong", the function of the digital imaging device 12 is limited. In a case where the function of the digital imaging device 12 is limited, the function to be limited may be changed through a setting.

Subsequently, the image analysis section 26 analyzes images captured by the plurality of digital imaging devices 12 during image capturing.

The image analysis section 26 performs at least one of determination, recognition, or the like of a blurriness level of an image, a brightness of the image, a color (saturation) of the image, the number of persons taken in the image, an expression of a person taken in the image, and an object taken in the image, as image analysis items, to calculate a score for each analysis item. Further, the image analysis section 26 may calculate an average point of scores for all the analysis items of each image, an average point of scores for all the analysis items of all images captured by the digital imaging device 12 of each user, and the like, as a score of an image.

In a case where a score for each analysis item is calculated, the image analysis section 26 sets a score for an analysis item of an inappropriate image to be lower than a score for an analysis item of an appropriate image. The inappropriate image refers to an image of which content is contrary to public order and morality, which is, for example, an image in which a person who is being bullied is taken, an image in which a person with a lot of skin exposure is taken, or the like. In addition, the inappropriate image may include an image with a wrong image quality, for example, an image with a large blurriness level, which may be freely set as necessary.

For example, in the case of the image in which the person who is being bullied is taken, there is a high possibility that the person has a crying face. Accordingly, in the case of the image in which the person who has the crying face is taken, on the basis of an analysis result of the person's expression, the image analysis section 26 sets a score for the analysis of the person's expression of the image to be lower than that of an image in which a person who has a normal expression is taken, and in the case of an image in which a person who has a smiling face is taken, the image analysis section 26 sets a score of analysis of the person's expression of the image to be higher than that of the image in which the person who has the normal expression is taken.

For example, in the case of an image of which the blurriness level is smaller than a threshold value, on the basis of an analysis result of the blurriness level, the image analysis section 26 sets a score of the analysis of the blurriness level of the image to be higher, and in the case of an image of which the blurriness level is equal to or larger than the threshold value, the image analysis section 26 sets a score of the analysis of the blurriness level of the image to be lower.

That is, in the case of the inappropriate image, scores for the respective analysis items become lower, and accordingly, scores of images become lower.

The item analysis may be performed through pattern recognition, or may be performed using a learning-completed model obtained by performing learning using a neural network. Further, the image analysis items and the analysis method are not particularly limited, and various image analysis items and analysis methods may be employed.

Subsequently, the analysis result storage section 28 stores each user and an analysis result of an image that is captured by the digital imaging device 12 of each user and is analyzed by the image analysis section 26 in association with each other.

Whenever an image is captured by the digital imaging device 12 of each user, each user and an analysis result of the captured image of each user may be accumulated in the analysis result storage section 28 in association with each other.

A method for associating a user and an image analysis result is not particularly limited, but as shown in Table 2, for example, each user, and an image name (file name) of an image of each user and an average point of scores of all analysis items of each image may be stored in association with each other.

TABLE 2

| User A | | User B | | User C | | |
|---|---|---|---|---|---|---|
| Image name | Score average point | Image name | Score average point | Image name | Score average point | ... |
| 0001.jpg | 80 | 0010.jpg | 70 | 0050.jpg | 90 | ... |
| 0002.jpg | 90 | 0011.jpg | 65 | 0060.jpg | 90 | ... |
| 0003.jpg | 95 | 0012.jpg | 80 | 0061.jpg | 96 | ... |
| ... | ... | ... | ... | ... | ... | ... |

In Table 2, image names of images of a user A are "0001.jpg", "0002.jpg", "0003.jpg", and so on, and average points of scores of all analysis items of respective images are "80", "90", "95", and so on. Here, the user A, and the image names of the respective images of the user A and the average points of the scores of all the analysis items of the respective images are stored in association with each other. This is similarly applied to other users B, C, and so on.

Subsequently, the evaluation information updating section 30 performs evaluation of an image captured by the digital imaging device 12 of each user on the basis of an analysis result stored in the analysis result storage section 28, that is, an analysis result of an image associated with each user during image capturing, and updates the evaluation information on each user stored in the evaluation information storage section 20 on the basis of the evaluation, that is, right and wrong of the evaluation for each user.

In the case of an inappropriate image, scores of respective analysis items are lower than those of an appropriate image. In a case where a score of a person's expression is smaller than a threshold value on the basis of an analysis result of a person's expression, for example, the evaluation information updating section 30 evaluates that the image is an inappropriate image with respect to the person's expression, and sets an evaluation for the user to become low on the basis of the evaluation. On the other hand, in a case where the score of the person's expression is equal to or larger than the threshold value, the evaluation information updating section 30 evaluates that the image is an appropriate image with respect to the person's expression, and sets an evaluation for the user to become high on the basis of the evaluation. This is similarly applied to other analysis items.

A method for updating the evaluation information is not particularly limited, and for example, an average point of scores for all analysis items of all images captured by the digital imaging device 12 of each user may be used as a score of the evaluation information on each user. For example, in a case where the average point of the scores for all the analysis items of all the images is 80 out of 100, the score of the evaluation information is set to 80 points. Further, the 80 points of the score of the evaluation information may be represented in 5 stages, that is, may be set as 4 out of 5 stages.

Alternatively, a ratio of the number of images of which an average point of scores for all analysis items is equal to or larger than a threshold value to all images captured by the digital imaging device 12 of each user may be used as a score of the evaluation information on each user. For example, in a case where the number of sheets of all images captured by a user is 100 and the number of sheets of images of which an average point of scores for all analysis items is equal to or larger than 80 points is 50, the ratio is 50%, and thus, the score of the evaluation information is set to 50. A score that corresponds to the threshold value may be set in advance.

Further, as an image analysis result, on the basis of the number of sheets of images, for example, even in a case where an image having a high evaluation is captured in only a first sheet and evaluation of imaging content of the image is high, a score of evaluation information on a lazy user who does not capture an image thereafter may be set to become low.

A timing when evaluation information is updated is not particularly limited, but for example, whenever an image is captured by the digital imaging device 12 of each user, or whenever a predetermined number of images is captured by the digital imaging device 12 of each user, the image analysis section 26 may analyze the image and the evaluation information updating section 30 may analyze the evaluation information on each user. Alternatively, the image analysis section 26 may update an image captured by the digital imaging device 12 of each user at a predetermined time interval, and whenever the image captured by the digital imaging device 12 of each user is analyzed by the image analysis section 26, the evaluation information updating section 30 may update the evaluation information on each user.

In the case of a user who is not associated with an image analysis result, that is, a user who first uses the digital imaging device 12, it is possible to associate the user with evaluation information that is set in advance. For example, in a case where the score of the evaluation information is represented in 5 stages, the user may be set to a third stage.

Subsequently, the face image capturing section 32 captures a face image of a user of each digital imaging device 12 during image capturing.

The face image capturing section 32 is a camera such as an in-camera provided in a digital imaging device, and a face image of a user of each digital imaging device 12 is captured by the in-camera provided in the digital imaging device 12 of each user.

Subsequently, the same person determination section 34 determines whether a user who uses each digital imaging device 12 is identical to a user of each digital imaging device 12 set by the user setting section 18 during image capturing.

Then, the synthetic image creation section 36 selects an image of which an average point of scores for all analysis items is equal to or larger than a threshold value to create a synthetic image such as a photo album (a photo book).

The synthetic image creation section 36 receives images captured by the respective digital imaging devices 12 from the respective digital imaging devices 12 in the evaluation collection device 14 to create a synthetic image.

Further, the evaluation information storage section 20 and the analysis result storage section 28 are storage devices such as a secure digital (SD) card, a hard disk drive (HDD), or a solid state drive (SSD).

Further, a location where user information, evaluation information, an image analysis result, an image evaluation result, and the like are stored is not particularly limited as long as the location is a location where the digital imaging device 12 and the evaluation collection device 14 can acquire such information. For example, the information may be stored in the digital imaging device 12 of each user or in the evaluation collection device 14, or may be stored in an external medium (recording medium) on which the digital imaging device 12 can perform writing and reading.

Figure 3:
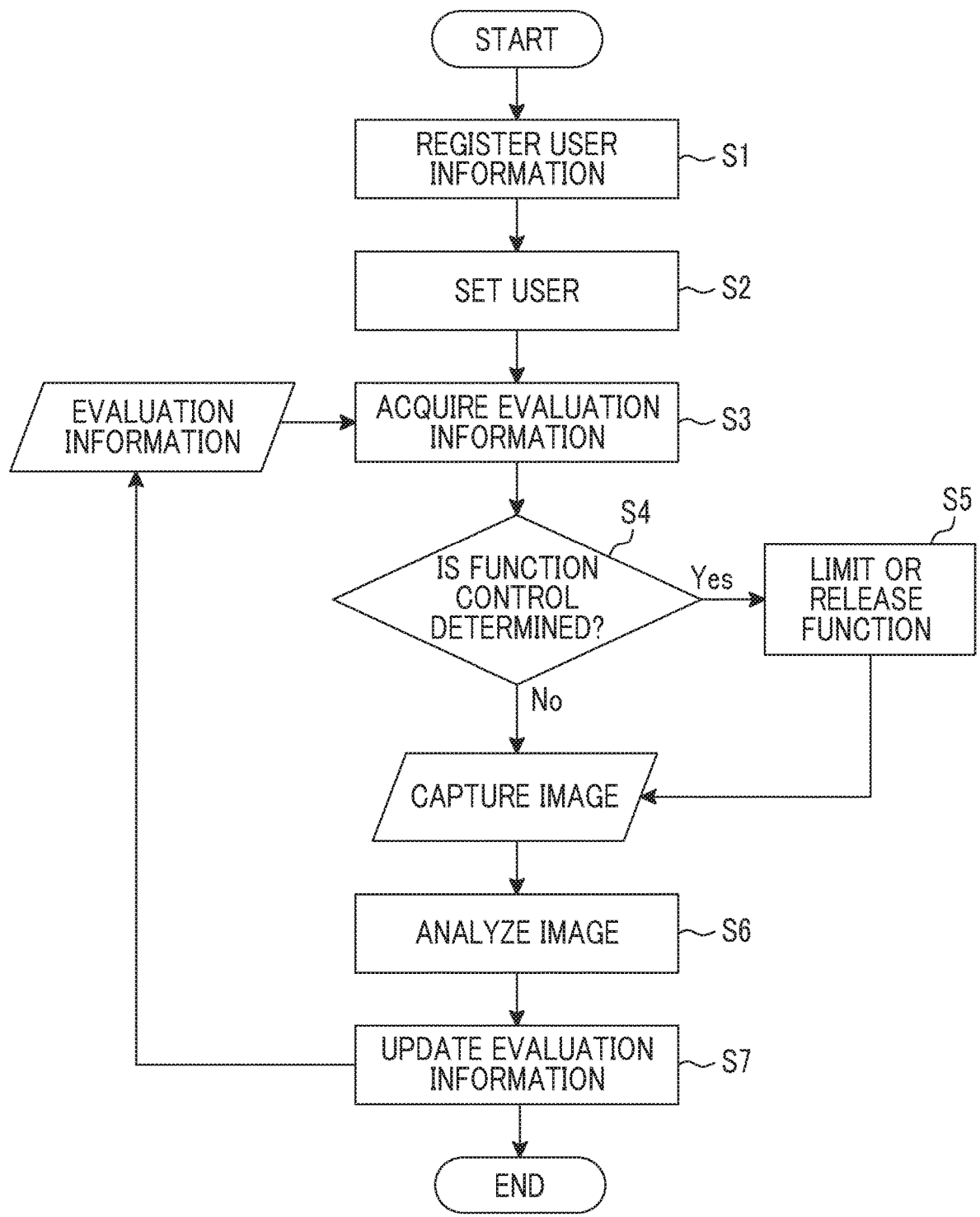
FIG. 3 is a flowchart showing an operation of the imaging control system.

Next, an operation of the imaging control system 10 will be described with reference to a flowchart of FIG. 3.

In using the imaging control system 10, each user manually operates a GUI for user registration and setting in each digital imaging device 12 to input information on each user.

In a case where the information on each user is input, the information on each user is registered by the user information registration section 16 (step S1).

Subsequently, each user manually operates the GUI for user registration and setting in each digital imaging device 12 to set a digital imaging device 12 to be used by each user.

In a case where the digital imaging device 12 to be used by each user is set, the user setting section 18 sets a plurality of users who respectively use the plurality of digital imaging devices 12 using information on the plurality of users registered in the user information registration section 16 (step S2).

Subsequently, evaluation information on each user is acquired into the digital imaging device 12 of each user from the evaluation information storage section 20 on the basis of a setting of the digital imaging device 12 to be used by each of the plurality of users, by the evaluation information acquisition section 22 (step S3).

Subsequently, it is determined whether to control a function of the digital imaging device 12 of each user on the basis of the evaluation information on each user (step S4).

As a result, in a case where the function of the digital imaging device 12 of each user is to be controlled (Yes in step S4), the function of the digital imaging device 12 of each user is limited, or the limited function is released (step S5). Then, the procedure proceeds to step S6.

The imaging function controller 24 limits the function of the digital imaging device 12 of a user who has a low score of the evaluation information, that is, a user with a wrong evaluation, for example, on the basis of the evaluation information, or sets the digital imaging device 12 so as not to be used to guide the user with the wrong evaluation to capture an appropriate image. On the other hand, by opening the function of the digital imaging device 12 of a user who has a high score of the evaluation information, that is, a user with a right evaluation, convenience in using the digital imaging device 12 is enhanced.

In this way, by controlling the function of the digital imaging device 12 to be used by each user on the basis of the evaluation information on each user, it is possible to prevent each user from using a captured image without permission or from capturing an inappropriate image, and to urge each user to capture an appropriate image.

On the other hand, in a case where the function of the digital imaging device 12 of each user is not to be controlled (No in step S4), the procedure proceeds to step S6.

Subsequently, each user captures an image using the digital imaging device 12 of each user.

In a case where the image is captured, the images captured by the plurality of digital imaging devices 12 are analyzed by the image analysis section 26. Each user and an analysis result of the image captured by the digital imaging device 12 of each user are stored in the analysis result storage section 28 in association with each other (step S6).

Then, evaluation of the image captured by the digital imaging device 12 of each user is performed on the basis of the analysis result stored in the analysis result storage section 28 by the evaluation information updating section 30. Subsequently, on the basis of the evaluation of the image captured by the digital imaging device 12 of each user, evaluation information on each user stored in the evaluation information storage section 20 is updated (step S7). Then, the procedure proceeds to step S3. Thereafter, the subsequent operations are repeated as described above.

Here, it is assumed that a user different from the user set by the user setting section 18 uses the digital imaging device 12. In setting a user of the digital imaging device 12, in a case where a user with a right evaluation performs setting and a different user captures an image using the digital imaging device 12 of the user with the right evaluation, there is a possibility that it is not possible to achieve prevention of capturing of an inappropriate image that is an object of the invention. In order to prevent such a situation, it may be determined whether the users are identical to each other by the same person determination section 34.

A method for determining whether the users are identical to each other and a determination timing are not particularly limited, but for example, the face image capturing section 32 may periodically capture a face image of each user, and the same person determination section 34 may compare, whenever the face image is captured by the face image capturing section 32, the face image captured by the face image capturing section 32 with a face image included in the information on the plurality of users registered in the user information registration section 16 during image capturing to determine whether the users are identical to each other.

Further, in a case where a state where the score of the evaluation information on each user is changed by a threshold value or greater consecutively occurs a predetermined number of times or more, the face image capturing section 32 may capture a face image of each user. Then, the same person determination section 34 may compare, in a case where the face image is captured by the face image capturing section 32, the face image captured by the face image capturing section 32 with a face image included in the information on the plurality of users registered in the user information registration section 16 during image capturing to determine whether the users are identical to each other. For example, in a case where the score of the evaluation information is set to 5 stages, it is determined whether face images of the users are captured and they are identical to each other in a case where a state where the evaluation information is changed from a fifth stage to a third stage or less consecutively occurs for a plurality of updating periods during image capturing.

Further, in a case where a state where the score of the evaluation information on each user is changed by a threshold value or greater consecutively occurs a predetermined number of times or more during image capturing, the same person determination section 34 may determine whether the users are identical to each other by requesting an input of a password for specifying the respective users.

In addition, the evaluation collection device 14 may receive evaluation information on a plurality of users. For example, in a case where the imaging control system 10 is used in a school event, a user who uses the evaluation collection device 14 is a teacher. By receiving the evaluation information on the plurality of users by the evaluation collection device 14, the teacher may determine whether evaluation of each user is right or wrong on the basis of a score of the evaluation information of each user, for example.

The evaluation collection device 14 may receive the evaluation information on the plurality of users at a predetermined time interval, or may receive the evaluation information on each user whenever an image is captured by the digital imaging device 12 of each user. Further, in a case where the score of the evaluation information is set to be changed in stages, the evaluation information on each user may be received whenever the evaluation information on each user is changed, or the evaluation information on each user may be received when each user gives a command for collecting the evaluation information on each user.

Further, in a case where the evaluation information on the plurality of users is received, the evaluation collection device 14 may transmit evaluation information on one digital imaging device 12 among the plurality of digital imaging devices 12 to another digital imaging device. Thus, since a different user is able to check evaluation information on a certain user, it is possible for respective users to guide each other so as not to capture an inappropriate image.

In addition, each digital imaging device 12 may transmit an image captured by each digital imaging device 12 to one or more evaluation collection devices 14. The images transmitted to the evaluation collection devices 14 may be used for check of image content and creation of a synthetic image, for example.

For example, in the case of an image of which an average point of scores for all analysis items is smaller than a threshold value, each digital imaging device 12 may lower an image quality of the image and may transmit the result to the one or more evaluation collection devices 14. There is a high possibility that the image of which the average point of the scores for all the analysis items is smaller than the threshold value is an inappropriate image, and thus, it is not desirable to spread the image. Further, since there is a low possibility that the image is used for creation of a synthetic image, the image has only to have such an image quality that its image content can be checked.

Further, in transmitting the image, each digital imaging device 12 may transmit information relating to the control of the function of the digital imaging device 12 when the image is captured to the one or more evaluation collection devices 14. By transmitting the information relating to the control of the function, for example, it is possible to make a user feel encouraged such that "A good image can be captured with an advanced function" or "How beautiful an image is when the function is restricted".

In a case where images are received from a plurality of users, the evaluation collection device 14 may transmit an image captured by one digital imaging device 12 among the plurality of digital imaging devices 12 to another digital imaging device 12. Thus, since a different user can check content of an image captured by a certain user, it is possible for respective users to guide each other so as not to capture an inappropriate image, and to increase a motivation for imaging.

Alternatively, the evaluation collection device 14 may transmit only an image of which an average point of scores for all analysis items is equal to or larger than a threshold value among all images captured by one digital imaging device 12 among the plurality of digital imaging devices 12 to another digital imaging device 12. There is a high possibility that the image of which the average point of the scores for all the analysis items is equal to or larger than the threshold value may be an appropriate image. Accordingly, without performing image analysis or the like again in the evaluation collection device 14, it is possible to use the image in a synthetic image. Further, by creating synthetic images for a photo album or the like only using appropriate images, for example, it is possible for a school teacher to easily view only the appropriate images, and to easily check whether a purpose of an event such as a school excursion has been achieved.

The imaging control system of the invention is not limited to a school event such as a school excursion, but may be similarly applied to a case where it is necessary to control image capturing in an event which a plurality of persons join, such as a railway mania rally, an idol event, or the like.

In the device of the invention, for example, a hardware configuration of processing units that execute various processes, such as the user information registration section 16, the user setting section 18, the evaluation information acquisition section 22, the imaging function controller 24, the image analysis section 26, the evaluation information updating section 30, the same person determination section 34, the synthetic image creation section 36, and the like, may be a dedicated hardware, or a variety of processors or a computer that executes a program.

The variety of processors includes a central processing unit (CPU) that is a general use processor that functions as a variety of processing units by executing software (program), a programmable logic device (PLD) that is a processor capable of changing a circuit configuration after manufacturing of a field programmable gate array (FPGA), or the like, a dedicated electric circuit that is a processor having a circuit configuration that is dedicatedly designed for performing a specific process such as an application specific integrated circuit (ASIC), or the like.

One processing unit may be configured by one processor among the variety of processors, or may be configured by a combination of the same type or different types of two or more processors, for example, a combination of a plurality of FPGAs, a combination of an FPGA and a CPU, or the like. Further, the plurality of processing units may be configured by one processor among a plurality of processors, or may be one processor by collecting two or more processing units among a plurality of processing units.

For example, as represented by a computer such as a server or a client, a configuration in which a combination of one or more CPUs and software forms one processor (or one processor is configured by a combination of one or more CPUs and software), and this processor functions as a plurality of processing units is employed. In addition, as represented by a system on chip (SoC) or the like, a configuration in which a processor for realizes an entire function of a system including a plurality of processing units using one integrated circuit (IC) chip is used is employed.

Further, the hardware configuration of the variety of processors is, more specifically, electric circuitry in which circuit elements such as semiconductors are combined.

In addition, a method of the invention may be executed by a program for causing a computer to execute respective steps. Further, a computer-readable recording medium on which the program is recorded may be also provided.

Hereinbefore, the invention has been described in detail, but the invention is not limited to the above-mentioned embodiment, and various modifications or changes may be employed in a range without departing from the concept of the invention.

EXPLANATION OF REFERENCES

10: imaging control system
12: digital imaging device
14: evaluation collection device
16: user information registration section
18: user setting section
20: evaluation information storage section
22: evaluation information acquisition section
24: imaging function controller
26: image analysis section
28: analysis result storage section
30: evaluation information updating section
32: face image capturing section
34: same person determination section
36: synthetic image creation section

What is claimed is:

1. An imaging control system that includes a plurality of digital imaging devices respectively used for capturing images by a plurality of users, and one or more evaluation collection devices that receive evaluation information of the plurality of users from the plurality of digital imaging devices, comprising a processor; wherein the processor:
registers information on the plurality of users;
sets the plurality of users who respectively use the plurality of digital imaging devices using the registered information on the plurality of users;
stores evaluation information on the plurality of users;
acquires the stored evaluation information on each user of the plurality of users to the digital imaging device of the each user, on the basis of settings of the digital imaging devices respectively used by the plurality of users;
controls a function of the digital imaging device of the each user, on the basis of the acquired evaluation information on the each user;
analyzes images captured by the plurality of digital imaging devices;
stores the each user and an analysis result of an image captured by the digital imaging device of the each user in association with each other; and
performs evaluation of the image captured by the digital imaging device of the each user on the basis of the stored analysis result, and updates the stored evaluation information on the each user on the basis of the evaluation of the image captured by the digital imaging device of the each user.

2. The imaging control system according to claim 1, wherein the processor performs at least one of determination or recognition of a blurriness level of an image, a brightness of the image, a color of the image, the number of persons taken in the image, an expression of a person taken in the image, and an object taken in the image, as items of the analysis, to calculate a score for each analysis item.

3. The imaging control system according to claim 2, wherein the processor uses an average point of scores for all the analysis items of all images captured by the digital imaging device of the each user as a score of the evaluation information on the each user.

4. The imaging control system according to claim 3, wherein the one or more evaluation collection devices receive the evaluation information on the each user whenever the evaluation information of the each user is changed in a case where the score of the evaluation information is set to be changed in stages.

5. The imaging control system according to claim 3, wherein each digital imaging device transmits the images captured by each of the digital imaging devices to the one or more evaluation collection devices, and in a case where the average point of the scores for all the analysis items of an image is smaller than a threshold value, each digital imaging device lowers an image quality of the image of which the average point of the scores is smaller than the threshold value and transmits the result to the one or more evaluation collection devices.

6. The imaging control system according to claim 3, wherein the one or more evaluation collection device transmits only an image of which the average point of the scores for all the analysis items is equal to or larger than a threshold value among all images captured by one digital imaging device among the plurality of digital imaging devices to another digital imaging device.

7. The imaging control system according to claim 3, wherein each digital imaging device transmits images captured by each of the digital imaging devices to the one or more evaluation collection devices, and wherein the one or more evaluation collection devices selects an image of which the average point of the scores for all the analysis items is equal to or greater than a threshold value to create a synthetic image.

8. The imaging control system according to claim 3, wherein the processor further:
captures a face image of the user of each digital imaging device during image capturing,
determines whether the user of each digital imaging device is identical to the user of each digital imaging device set during image capturing,
captures the face image of the each user in a case where a state where the score of the evaluation information on the each user is changed by a threshold value or greater consecutively occurs a predetermined number of times or more, and
wherein in a case where the face image is captured, the processor compares the captured face image during image capturing with a face image included in the information on the plurality of users to determine whether both the users are identical to each other.

9. The imaging control system according to claim 3, wherein the processor further:
determines whether the user of each digital imaging device is identical to the set user of each digital imaging device during image capturing, and
wherein in a case where a state where the score of the evaluation information on the each user is changed by a threshold value or greater consecutively occurs a predetermined number of times or more, the processor determines whether the users are identical to each other by requesting inputs of passwords for specifying the respective users.

10. The imaging control system according to claim 2, wherein the processor uses a ratio of the number of images of which an average point of scores for all the analysis items is equal to or larger than a threshold value to all images captured by the digital imaging device of the each user, as a score of the evaluation information on the each user.

11. The imaging control system according to claim 2, wherein the processor performs evaluation of the image using at least the score as the analysis result.

12. The imaging control system according to claim 2, wherein the processor uses an average point of scores for at least one of the analysis items of at least one of the images captured by the digital imaging device of the each user as a score of the evaluation information on the each user.

13. The imaging control system according to claim 1, wherein the one or more evaluation collection devices receive the evaluation information on the plurality of users at a predetermined time interval, receive the evaluation information on the each user whenever an image is captured by the digital imaging device of the each user, or receive the evaluation information on the each user in a case where the each user gives a command for collecting the evaluation information on the each user.

14. The imaging control system according to claim 1, wherein the one or more evaluation collection devices transmit the evaluation information on one digital imaging device among the plurality of digital imaging devices to another digital imaging device, or transmit an image captured by each of the digital imaging devices to the one or more evaluation collection devices.

15. The imaging control system according to claim 14, wherein each digital imaging device further transmits, in a case where the image is transmitted, information relating to the control of the function of the digital imaging device in a case where the image is captured to the one or more evaluation collection devices.

16. The imaging control system according to claim 1, wherein whenever an image is captured by the digital imaging device of the each user, the processor analyzes the image, and updates the evaluation information on the each user, or whenever a predetermined number of images are captured by the digital imaging device of the each user, the processor analyzes the images, and updates the evaluation information on the each user.

17. The imaging control system according to claim 1, wherein the processor analyzes the image captured by the digital imaging device of the each user at a predetermined time interval, and whenever the image captured by the digital imaging device of the each user is analyzed, the processor updates the evaluation information on the each user.

18. The imaging control system according to claim 1, wherein the processor further:
determines whether the user of each digital imaging device is identical to the user of each digital imaging device set by the user setting section during image capturing.

19. The imaging control system according to claim 18, wherein the processor further:
captures a face image of the user of each digital imaging device during image capturing, and
periodically captures the face image of the each user, and
wherein whenever the face image is captured, the processor compares the face image captured during image capturing with a face image included in the information on the plurality of users to determine whether both the users are identical to each other.

20. The imaging control system according to claim 1, wherein the processor controls at least one of a hardware function of the digital imaging device or a software function of the digital imaging device, as a function of the digital imaging device.

21. An imaging control method for controlling image capturing in an imaging control system that includes a plurality of digital imaging devices respectively used for capturing images by a plurality of users and one or more evaluation collection devices that receive evaluation information of the plurality of users from the plurality of digital imaging devices, the method comprising:
- registering information on the plurality of users, through a user information registration section;
- setting the plurality of users who respectively use the plurality of digital imaging devices using the information on the plurality of users registered in the user information registration section, through a user setting section;
- storing evaluation information on the plurality of users, through an evaluation information storage section;
- acquiring the evaluation information on each user of the plurality of users from the evaluation information storage section to the digital imaging device of the each user, on the basis of settings of the digital imaging devices respectively used by the plurality of users, through an evaluation information acquisition section;
- controlling a function of the digital imaging device of the each user, on the basis of the acquired evaluation information on the each user through an imaging function controller;
- capturing images by the function of the digital imaging device of the each user under the control of the imaging function controller;
- analyzing images captured by the plurality of digital imaging devices, through an image analysis section;
- storing the each user and an analysis result of an image captured by the digital imaging device of the each user in association with each other, through an analysis result storage section; and
- performing evaluation of the image captured by the digital imaging device of the each user on the basis of the analysis result stored in the analysis result storage section, and updates the evaluation information on the each user stored in the evaluation information storage section on the basis of the evaluation of the image captured by the digital imaging device of the each user, through an evaluation information updating section.

22. A non-transitory computer-readable recording medium on which a program for causing a computer to execute the respective steps of the imaging control method according to claim 21 is recorded.

* * * * *